(12) United States Patent
Mathur et al.

(10) Patent No.: US 10,309,299 B2
(45) Date of Patent: Jun. 4, 2019

(54) SYSTEMS AND METHODS FOR USE WITH INTERNAL COMBUSTION ENGINES AND VEHICLES COMPRISING THE SAME

(71) Applicant: Purdue Research Foundation, West Lafayette, IN (US)

(72) Inventors: Adhiraj B. Mathur, Columbus, IN (US); Haiyan Henry Zhang, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 15/209,556

(22) Filed: Jul. 13, 2016

(65) Prior Publication Data
US 2017/0016392 A1 Jan. 19, 2017

Related U.S. Application Data

(60) Provisional application No. 62/191,564, filed on Jul. 13, 2015.

(51) Int. Cl.
*F02B 39/08* (2006.01)
*F02G 5/02* (2006.01)

(52) U.S. Cl.
CPC .............. *F02B 39/085* (2013.01); *F02G 5/02* (2013.01); *F02G 2254/15* (2013.01); *F02G 2280/50* (2013.01); *Y02E 20/363* (2013.01); *Y02T 10/166* (2013.01)

(58) Field of Classification Search
CPC ...... F02B 39/085; F02G 5/02; F02G 2280/50; F02G 2254/15; Y02T 10/166; Y02E 20/363

USPC ............ 60/605.1, 605.2, 614, 616, 619, 620
See application file for complete search history.

(56) References Cited

U.S. PATENT DOCUMENTS

| 3,795,231 | A | * | 3/1974 | Brille | F02B 37/04 123/179.28 |
| 4,380,152 | A | * | 4/1983 | Folsom | F02G 1/0435 60/517 |
| 4,630,447 | A | * | 12/1986 | Webber | F02B 41/06 60/516 |
| 5,555,730 | A | * | 9/1996 | Hope | F01B 9/023 123/41.73 |
| 6,651,433 | B1 | * | 11/2003 | George, Jr. | B63G 8/12 60/614 |
| 7,181,912 | B2 | * | 2/2007 | Mori | B60K 8/00 60/517 |

(Continued)

FOREIGN PATENT DOCUMENTS

CN 204267172 4/2015

*Primary Examiner* — Hoang M Nguyen
(74) *Attorney, Agent, or Firm* — Hartman Global IP Law; Gary M. Hartman; Domenica N.S. Hartman

(57) ABSTRACT

Systems, methods, and vehicles for use with internal combustion engines comprising combustion chambers that produce exhaust gases that include a Stirling engine having a hot side and a cold side with the hot side being in thermal contact with exhaust gases produced by the internal combustion engine. The Stirling engine is configured to be powered by heat from the exhaust gases during operation of the internal combustion engine, and a compressor powered by the Stirling engine is configured to provide compressed air to combustion chambers of the internal combustion engine.

17 Claims, 8 Drawing Sheets

(56) References Cited

U.S. PATENT DOCUMENTS

| | | | |
|---|---|---|---|
| 7,891,186 B1* | 2/2011 | Primlani | F01K 23/065 60/597 |
| 7,895,835 B2* | 3/2011 | Yaguchi | F02B 73/00 60/285 |
| 8,671,684 B2* | 3/2014 | Moriarty | F03G 6/001 123/3 |
| 2009/0013686 A1 | 1/2009 | Yaguchi et al. | |
| 2011/0131984 A1* | 6/2011 | Lofgren | F02B 37/105 60/607 |
| 2012/0227389 A1* | 9/2012 | Hinderks | F01B 1/10 60/317 |

* cited by examiner

SYSTEMS AND METHODS FOR USE WITH INTERNAL COMBUSTION ENGINES AND VEHICLES COMPRISING THE SAME

CROSS REFERENCE TO RELATED APPLICATIONS

This application claims the benefit of U.S. Provisional Application No. 62/191,564, filed Jul. 13, 2015, the contents of which are incorporated herein by reference.

BACKGROUND OF THE INVENTION

The present invention generally relates to engines. The invention particularly relates to recovery of energy from exhaust gases produced by an internal combustion engine.

Today's society largely relies on internal combustion engines for transportation, commerce and power generation, particular examples of which include earth moving equipment, tractors, aircrafts, and ships. An example of an internal combustion (IC) engine is the Otto cycle engine used in most automotive vehicles these days. An IC engine operating on the principles of the Otto cycle comprises four strokes namely, intake, compression, power, and exhaust, which occur within what is commonly termed a combustion chamber or cylinder. During the intake stroke, a finite volume of air, determined by what is commonly referred to as the cylinder swept volume, is drawn into the combustion chamber along with a quantity of fuel for compression during the compression cycle and subsequent combustion of the fuel during the power cycle. The mass of this finite volume of air is dependent on the ambient temperature and pressure from which the air is drawn. Because air density increases as temperature decreases, a larger mass of air can be drawn into the combustion chamber at colder ambient temperatures, as compared to higher ambient temperatures. The ratio between the mass air flow into the engine and the cylinder swept volume is known as the volumetric efficiency ($\eta_v$) of the engine. The typical volumetric efficiency of a normal IC engine at open throttle is between about seventy-five and ninety percent.

The internal combustion engine powers millions of passenger cars and other vehicles. These vehicles consume fuel to extract energy which accounts for the consumption of millions of barrels of crude oil per day. This high fuel demand leads manufacturers to increase the efficiency of engines and make them more fuel efficient. By utilizing a turbocharger, the size of engines can be reduced with minimal reduction in power output.

A turbocharger is a device which forces a higher volume of air into the combustion chamber of the engine during the intake stroke, increasing the oxygen content in the chamber for combustion and the volumetric efficiency of the engine. This has a direct correlation on the amount of torque and power produced. A turbocharger generally includes a compressor driven by a turbine, which in turn is driven by the flow of exhaust gases from the engine, specifically by exhaust gas recirculation (EGR). A supercharger is a similar device, but instead of EGR powering the turbine, power is drawn from the crankshaft of the engine via mechanical linkages.

Current commercially available turbochargers generally suffer from various limitations. Power lag or turbocharger lag is the time required to change power output in response to a throttle change (that is, the time between when the driver presses the accelerator pedal creating a torque request and when the turbocharger actually produces power), noticed as a hesitation or slowed throttle response when accelerating as compared to a naturally aspirated engine. This is due to the time needed for the exhaust system and turbocharger to generate the required boost. Inertia, friction, and compressor load are the primary contributors to power lag.

Because turbochargers are physically driven by the flow of exhaust gases, their performance is influenced as a result of exhaust gases exiting internal combustion engines in pulses, rather than a constant flow. Turbochargers inherently promote the generation of exhaust gas back pressure due to the turbine vane intrusion. This back pressure may hinder the in-cylinder pressure of cylinders within the engine, which have open exhaust valves during the exhaust stroke, and can affect the exhaust stroke pumping work and pressure. The back pressure may also increase the residual burnt mass fraction in the cylinders which can lead to advanced ignition and retardation of the 50% burn crank angle, causing reduction in combustion efficiency and increased emissions. However, turbochargers are very susceptible to the exhaust gas pressure and for low pressure conditions, turbochargers may generate less than optimal in-cylinder pressures.

Often, not all of the exhaust gases produced by the engine is used to drive the turbine, and a portion of exhaust gases is bypassed through a waste gate into the tailpipe. This excess bypass does zero work and can be a significant source of energy loss. Capturing this energy could reduce waste and increase the efficiency of the engine as more work is done by the same chemical bond energy released by the fuel.

In addition to the above limitations, turbochargers are also generally loud while running at higher rpm, and depend on oil for lubrication that is not available until after the engine has started. Turbochargers also tend to be expensive due to their highly detailed geometry.

In view of the above, it can be appreciated that it would be desirable if systems and methods were available for promoting the efficiency and performance of internal combustion engines that induct compressed air into their combustion chambers while eliminating or reducing the problems, shortcomings or disadvantages associated with turbochargers.

BRIEF DESCRIPTION OF THE INVENTION

The present invention provides systems and methods suitable for promoting the efficiency and performance of internal combustion engines through the means by which compressed air is induced into their combustion chambers.

According to one aspect of the invention, a system is provided for use with an internal combustion engine comprising combustion chambers within which compression and power strokes occur. The system includes a Stirling engine having a hot side and a cold side with the hot side being in thermal contact with exhaust gases produced by the internal combustion engine. The Stirling engine is configured to be powered by heat from the exhaust gases during operation of the internal combustion engine, and the system comprises a compressor that is powered by the Stirling engine and configured to provide compressed air to the combustion chambers of the internal combustion engine.

According to another aspect of the invention, a method of improving the efficiency of an internal combustion engine includes recovering thermal energy from exhaust gases produced by the internal combustion engine, converting the thermal energy recovered from the exhaust gases into mechanical energy, using the mechanical energy to power a compressor, and operating the compressor to provide compressed air to combustion chambers of the internal combustion engine.

According to another aspect of the invention, a vehicle is provided having an internal combustion engine comprising combustion chambers within which compression and power strokes occur. The vehicle includes a Stirling engine having a hot side and a cold side with the hot side in thermal contact with exhaust gases produced by the internal combustion engine and a compressor powered by the Stirling engine and configured to provide compressed air to the combustion chambers of the internal combustion engine. Wherein during operation of the internal combustion engine, heat from the exhaust gases powers the Stirling engine.

Technical effects of the systems and methods described above preferably include the ability to provide compressed air into the combustion chamber of an internal combustion engine preferably without or with reduced power lag, back pressure, fuel consumption, and emissions relative to commercially available turbochargers.

Other aspects and advantages of this invention will be better appreciated from the following detailed description.

BRIEF DESCRIPTION OF THE DRAWINGS

FIGS. 6, 7, 8, 9, and 10 represent output power, operating speed, boost pressure, mass flow rate, and thermal efficiencies, respectively, of the devices.

FIG. 11 represents performance of an IC engine while operating with one of the devices.

DETAILED DESCRIPTION OF THE INVENTION

Figure 1:
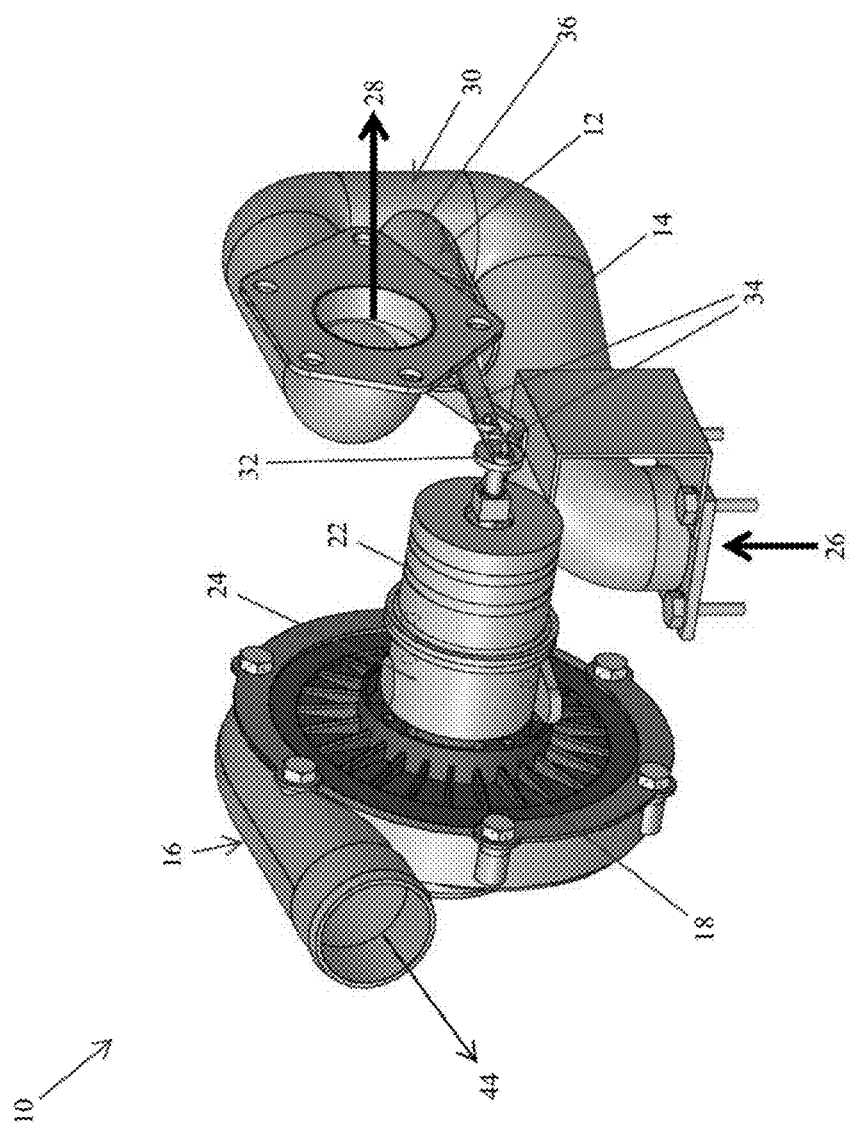
FIG. 1 represents a device that includes a compressor driven by a beta-type Stirling engine.

Disclosed herein are systems and methods intended to be capable of promoting the efficiency and performance of an internal combustion (IC) engine by increasing the mass of air forced into a combustion chamber of the engine, thereby increasing the oxygen content in the combustion chamber of the engine. In lieu of a turbocharger or supercharger, systems and methods described below use what is referred to herein as a stirlocharger, which as used herein will refer to a device that includes a compressor driven by a Stirling engine that is powered by heat in the exhaust gases produced by an IC engine.

The Stirling engine was invented by Sir Robert Stirling in 1816, and has been in use since 1979. Stirling engines are closed cycle air engines that convert thermal energy (heat) to mechanical energy by cyclic compression and expansion of a gaseous working fluid. Although there are several types of Stirling engines, the three notable types of Stirling engines are the alpha, beta, and gamma configurations. The alpha configuration ("alpha-type") has two power pistons, one in a "hot" cylinder and one in a "cold" cylinder, and a gaseous working fluid ("gas") is driven between the two cylinders by their pistons. This type of configuration is typically in a V-formation with the pistons joined at the same point on a crankshaft. The beta configuration ("beta-type") has a single cylinder with a "hot" end and a "cold" end, a power piston within the cylinder, and a displacer that drives a gaseous working fluid between the hot and cold ends. Beta-type Stirling engines are typically used with a rhombic drive to achieve a phase difference between their displacer and power piston, though alternatively the displacer and power piston may be joined ninety degrees out of phase on a crankshaft. The gamma configuration ("gamma-type") has two cylinders, one of which contains a displacer and "hot" and "cold" ends, whereas the other cylinder contains a power piston. The cylinders are joined to form a single space with the same pressure in both cylinders and the pistons are typically in parallel and joined ninety degrees out of phase on a crankshaft. It should be understood that the terms "hot" and "cold" are used herein as relative terms.

In normal operation, a Stirling engine is sealed and no gas enters or leaves the engine. The engine cycles through four main processes: cooling, compression, heating, and expansion. This is accomplished by moving the gaseous working fluid back and forth between hot and cold cylinders (in the case of alpha-type engines) or hot and cold ends of a cylinder (in the case of a beta- and gamma-type engines). The hot cylinders and ends and the cold cylinders and ends are collectively referred to herein as "hot" and "cold" sides, respectively. The hot side is in thermal contact with an external heat source, and the cold side may be in thermal contact with an external heat sink, such as air fins. In general, a change in temperature of the gaseous working fluid causes a corresponding change in pressure which acts on the power piston to produce a power stroke, while the motion of the piston causes the gaseous working fluid to be alternately expanded and compressed.

The hot side can be powered by any heat source, as nonlimiting examples, heat generated by a fuel burner, a solar concentrator, a geothermal plant, a nuclear plant, or biological sources. Stirling engines are capable of producing a relatively high amount of torque for small applications such as water pumps, cryocoolers, heat pumps, etc. The engines are usually low power, quiet, and produce almost zero emissions. The output capacity of such an engine varies with size, and can be used in automotive applications which are sensitive to size and packaging. Stirling engines usually have relatively high efficiency in the order of about 40%. The Stirling engine does well in low pressure environments as there is no direct pressure driving any impeller, and instead the system relies on heat transfer between the heat source and the hot side of the engine.

The present invention proposes the use of stirlochargers as replacements for turbochargers or supercharger in IC engines, and preferably does so in a manner that obtains at least some of the above-noted benefits of Stirling engines. In particular, the stirlocharger may include a Stirling engine mounted in parallel with the intake manifold of an IC engine and be connected to a passage that has engine exhaust gas recirculating within it. The Stirling engine may use the EGR flow and other minute heat transfers from the IC engine to heat the hot side of the Stirling engine and thereby produce mechanical energy. The Stirling engine may be used to drive an impeller of a compressor adapted to provide compressed air to the combustion chambers of the IC engine. As such, the stirlocharger recovers thermal energy in the form of waste heat in order to promote the efficiency of the IC engine during operation, in contrast to conventional turbochargers that recover mechanical energy from the flow of exhaust gases. Although the embodiments herein are described in reference to alpha- and beta-type Stirling engines, it is within the scope of the invention that stirlochargers may comprise any type of Stirling engine or similarly functioning heat engine.

Figure 2:
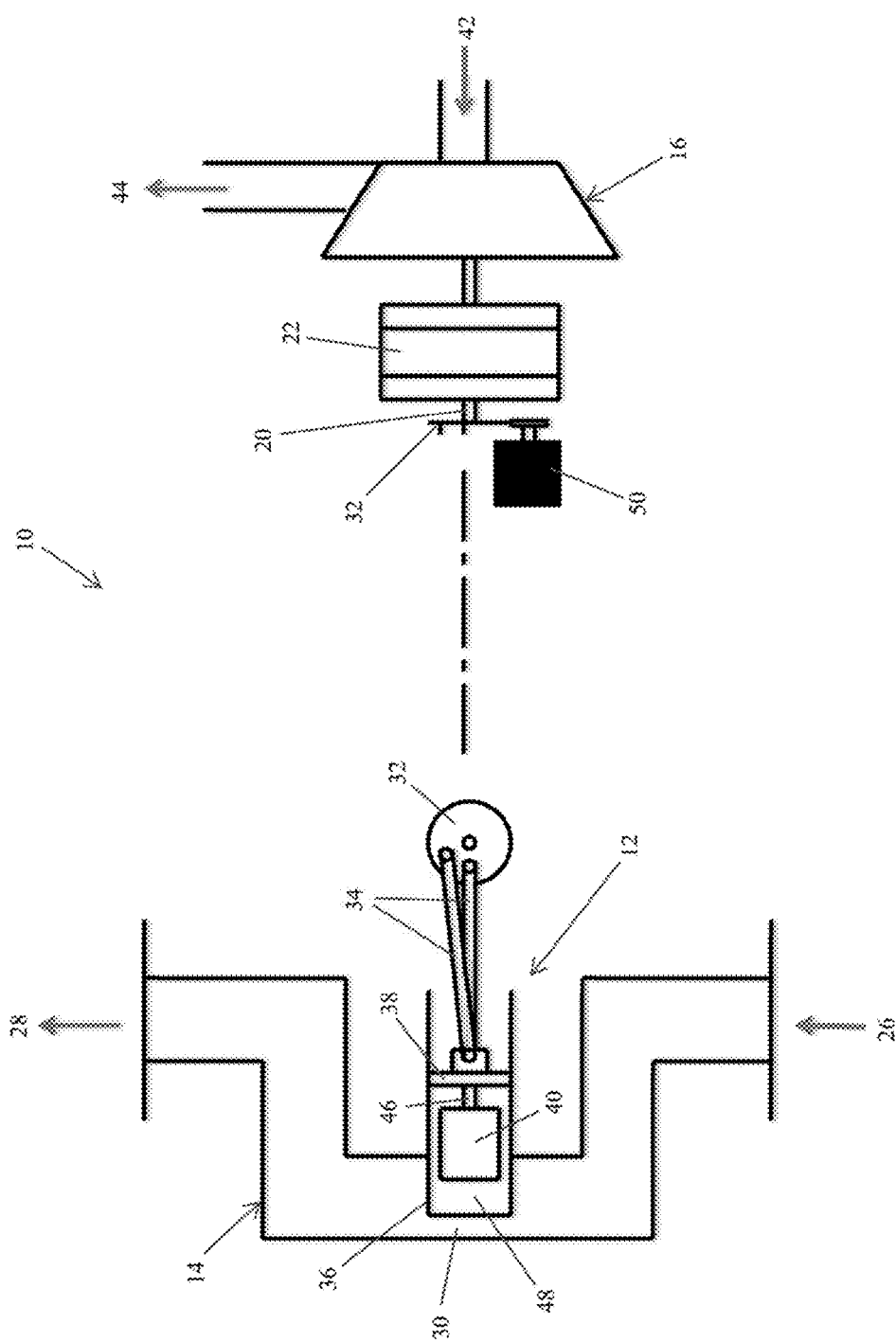
FIG. 2 schematically represents the device of FIG. 1. The image to the left shows internal components of the Stirling engine and the image to the right shows components associated with a compressor. The image to the right is a side view of the image to the left.

FIG. 1 represents a first nonlimiting embodiment of a stirlocharger 10 comprising a beta-type Stirling engine 12 coupled to a compressor 16. In this embodiment, the beta-type Stirling engine 12 is used due to its reduced complexity in design and ease of implementation relative to other types of Stirling engines. The beta-type Stirling engine is a single axis engine which is relatively small in size and has a relatively high power-to-size ratio. FIG. 2 schematically represents internal components of the Stirling engine 12 (left image) and certain components associated with the compressor 16 (right image) of FIG. 1. The image to the right is a side view of the image to the left, that is, the orientation of the flywheel 32 is rotated ninety degrees from the left image to the right image.

The beta-type engine 12 shown in FIGS. 1 and 2 includes a single cylinder 36 having therein a power piston 38 and a displacer 40 coupled to a shaft 46 that form an assembly capable of reciprocating within the cylinder 36. The piston 38 is typically slidable supported by the shaft 46 to allow axial movement of the piston 38 relative to the axial movement of the displacer 40 and shaft 46. A gaseous working fluid contained within an internal volume 48 of the cylinder 36 is capable of being displaced (shunted) by and around the displacer 40 to flow between hot and cold sides (ends) of the cylinder 36. The piston 38 and the displacer 40 are individually coupled to a flywheel 32 with links 34 at locations on the flywheel 32 that are offset, for example, by 90 degrees. The hot side of the cylinder 36 is in thermal contact with a heat exchange zone 30 of an exhaust manifold 14 of an IC engine. For example, the hot side of the cylinder 36 may protrude at least partially into an exhaust gas flow passage within the exhaust manifold 14 such that exhaust gases traveling through the exhaust manifold 14 contact an exterior of the cylinder 36 on its hot side. FIGS. 1 and 2 represent the path of exhaust gases through the exhaust manifold 14 with an intake arrow 26 and an output arrow 28. The cold side of the cylinder 36 is generally considered as the end of the cylinder 36 opposite its hot side.

During operation, the exhaust gases heat the gaseous working fluid within the hot side of the cylinder 36, causing the pressure of the working fluid to increase and the piston 38 to travel within the cylinder 36 away from the hot side to the cold side of the cylinder 36. This action is termed the power stroke of the engine 12 that, via the corresponding link 34, rotates the flywheel 32. Rotation of the flywheel 32 causes the displacer 40, via its corresponding link 34, to travel within the cylinder 36 toward the hot side, shunting the working fluid to the cold side of the cylinder 36. The displacer 40 preferably has a loose fit on the shaft 46 so that it does not extract any significant amount of power from the working fluid but only serves to shunt the working fluid between the hot and cold sides of the cylinder 36. The working fluid is cooled by the cold side of the cylinder 36, after which the momentum of the flywheel 32 pushes the piston 38 back toward the hot side of the cylinder 36, thereby forcing the working fluid back toward the hot side where it is compressed by the piston 38 and can again be heated to repeat the process. Less energy is required for the compression stroke than that produced by the power stroke since the pressure of the working fluid drops when it is cooled.

The flywheel 32 is coupled to and rotates a shaft 20 coupled to an impeller 18 of the compressor 16. As such, the mechanical energy produced by the Stirling engine 12 rotates the impeller 18 of the compressor 16, which is used by the compressor 16 to compress intake air (e.g., ambient air) that is then delivered to combustion chambers of the IC engine. In the schematic representation of FIG. 2, intake air enters the compressor 16 at arrow 42 and compressed air exits the compressor 16 at arrow 44. Preferably, the shaft 20 is functionally coupled to the impeller 18 through a gear box 22 and a shaft lubrication housing 24 (not shown in FIG. 2). The gearbox 22 may be used to amplify the rotational speed of the impeller 18 relative to the rotating speed of the flywheel 32 and shaft 20. The shaft lubrication housing 24 may comprise an internal oil for lubricating moving components of the stirlocharger 10. In this embodiment, the stirlocharger 10 does not require oil to be fed from an external source as required by turbochargers. Operation and construction of the gear box 22, shaft lubrication housing 24, and compressor 16 are well known in the art and will not be explained further herein.

Figure 3:
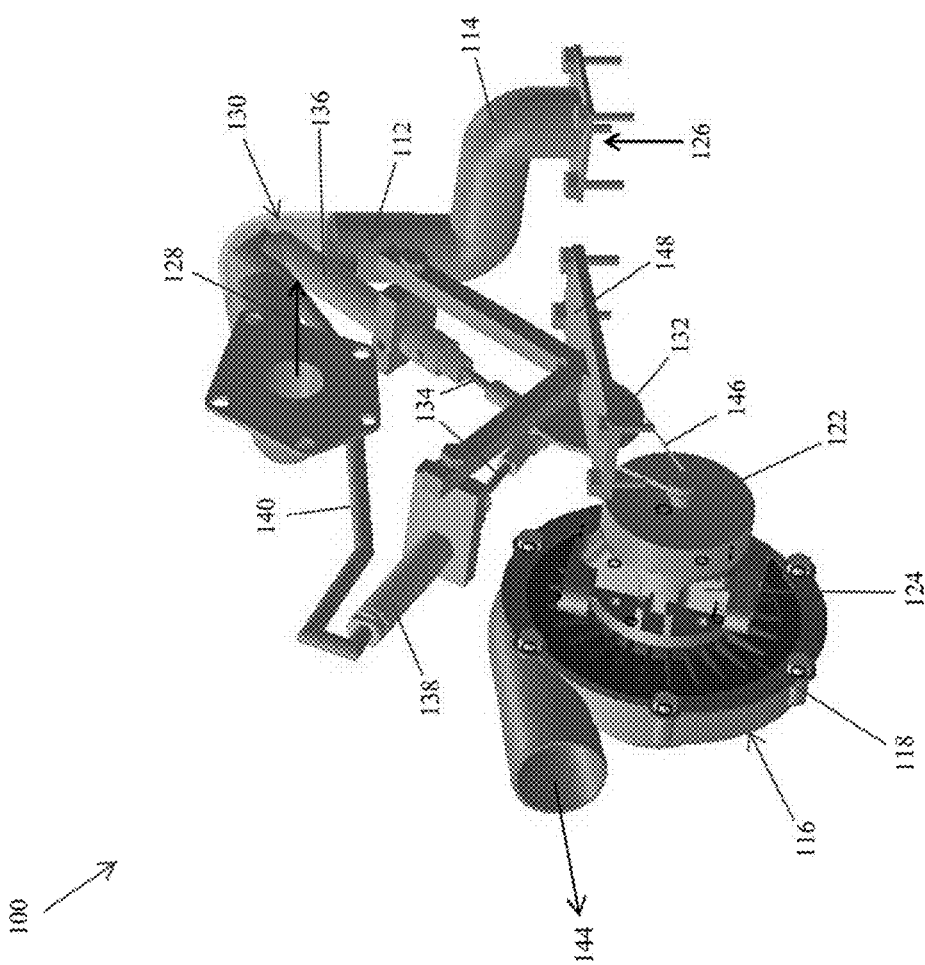
FIG. 3 represents a device that includes a compressor driven by an alpha-type Stirling engine.
Figure 4:
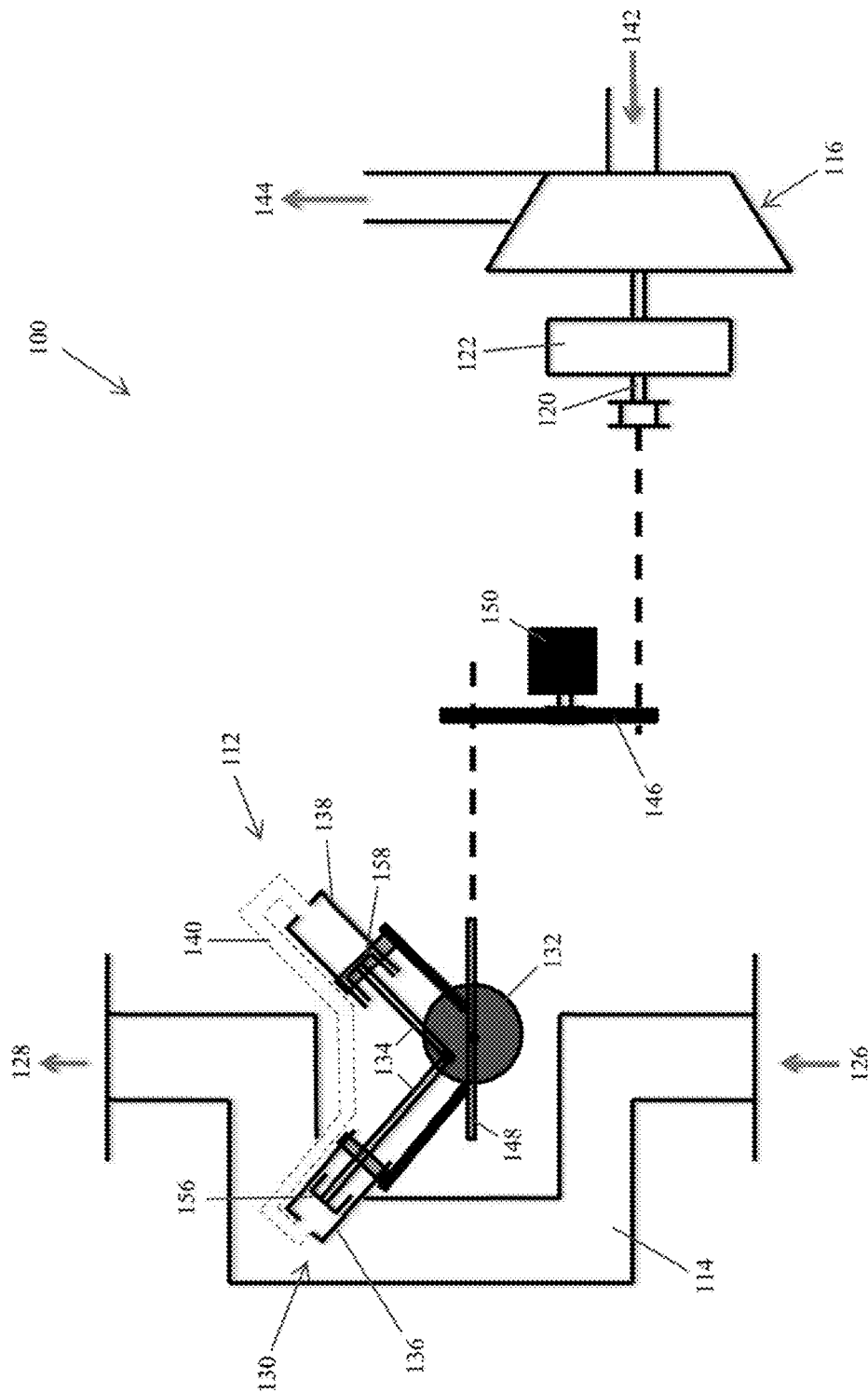
FIG. 4 schematically represents the device of FIG. 3. The image to the left shows internal components of the Stirling engine and the images in the middle and to the right shows components associated with a compressor. The images in the middle and to the right are side views of the image to the left.

FIG. 3 represents a second nonlimiting embodiment of a stirlocharger 100 comprising an alpha-type Stirling engine 112 coupled to a compressor 116. In this embodiment, the alpha-type Stirling engine 112 is used due to its relatively higher power-to-size ratio relative to other types of Stirling engines. The engine 112 is depicted as a V-shaped, dual axis engine. FIG. 4 schematically represents internal components of the Stirling engine 112 (left image) and certain components associated with compressor 116 (middle and right images) of FIG. 3. The image to the right is a side view of the image to the left, that is, the orientations of the belt 146 and the shaft 120 are rotated ninety degrees relative to the flywheel 132.

The alpha-type engine 112 includes two power pistons 156 and 158 adapted to reciprocate in separate cylinders, one of which operates as a hot cylinder 136 and the other a cold cylinder 138. A gaseous working fluid is contained in the hot cylinder 136, the cold cylinder 138, and a passage 140 that fluidly couples the hot and cold cylinders 136 and 138. The passage 140 may include a regenerator for thermal energy storage and improvement of the efficiency of the Stirling engine 112. The two power pistons 156 and 158 are individually coupled to a flywheel 132 at a common location with links 134 and are supported by a base or structure 148. The hot cylinder 136 is in thermal contact with a heat exchange zone 130 of an exhaust manifold 114 of an IC engine. For example, the hot cylinder 136 may protrude at least partially into an exhaust gas flow passage within the exhaust manifold 114 such that exhaust gases traveling through the exhaust manifold 114 contact an exterior of the hot cylinder 136. FIG. 3 represents the path of exhaust gases through the exhaust manifold 114 with an intake arrow 126 and an output arrow 128.

During operation, the exhaust gases heat the gaseous working fluid within the hot cylinder 136, causing the pressure of the working fluid within the cylinder 136 to increase. For the purpose of this description, it will be assumed that a first of the power pistons 156 within the hot cylinder 136 is initially at the bottom of its stroke corresponding to a maximum volume for the working fluid in the hot cylinder 136, and the second power piston 158 within the cold cylinder 138 is initially at the top of its stroke corresponding to a minimum volume for the working fluid in the cold cylinder 138. Since the first piston 156 is at the bottom of its stroke, as the working fluid is heated and expands within the hot cylinder 138, the increasing volume of the working fluid causes the volume of the system to increase as the working fluid expands into the cold cylinder 138, causing the second piston 158 to travel within the cold cylinder 138 toward the bottom of its stroke and, via the corresponding link 134, rotate the flywheel 132. As the working fluid in the cold cylinder 138 cools, its pressure decreases. Because of the momentum of the flywheel 132 and/or the second piston 158, the first piston 156 within the hot cylinder 136 begins an upstroke reducing the volume for the working fluid within the hot cylinder 138 and reducing the volume of the system as a whole.

At this point, a majority of the working fluid will be within the cold cylinder 138 and the fluid will continue to cool, reducing the pressure of the working fluid and causing contraction thereof. Once the hot cylinder 136 is at a minimum volume and the cold cylinder 138 is at its maximum volume, the volume of the system is further reduced by compression of the working fluid within cold cylinder 138 via movement of the second piston 158 toward the top of its stroke. As the volume of the working fluid within the cold cylinder 138 decreases, the system arrives at its minimum volume and the working fluid has greater contact with the hot cylinder 136. Once again, the working fluid is heated and the volume of the system increases by expansion of the working fluid within the hot cylinder 136, causing the first piston 156 to travel toward the bottom of its stroke. This process is continuously repeated as long as the hot cylinder 136 is heated by exhaust gases flowing through the exhaust manifold 114.

Figure 5:
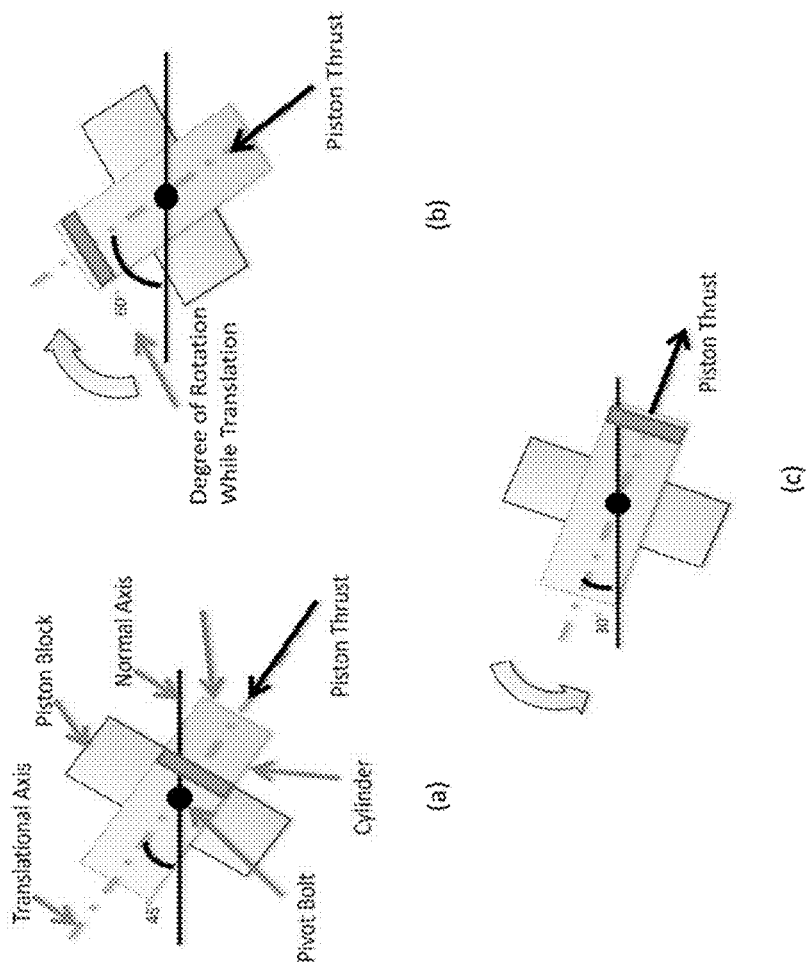
FIG. 5 schematically represents three images (a), (b), and (c), depicting piston/cylinder rotation in an alpha-type Stirling engine.

The axes of the hot and cold cylinders 136 and 138 are preferably variable and not fixed with respect to each another. As such, the cylinders 136 and 138 are allowed to pivot to reduce or minimize friction by keeping the linear piston thrust force as close to normal (horizontal) to the translational axis of the cylinder 136/138 as possible. As an example, FIG. 5 contains images (a), (b), and (c) that schematically represent rotation of a piston/cylinder combination during operation that is representative of the first and second pistons 156 and 158 and the hot and cold cylinders 136 and 138 of the stirlocharger 100 in FIGS. 3 and 4. Image (a) represents a baseline position of the piston/cylinder. As represented, a longitudinal axis of the piston/cylinder is located forty-five degrees clockwise from a normal (horizontal) axis. Image (b) represents the piston/cylinder as the piston approaches top dead center, that is, its position farthest from the flywheel. In this position, the translational axis of the cylinder is rotated about fifteen degrees clockwise from its baseline position. Image (c) represents the piston/cylinder as the piston approaches bottom dead center, that is, its position nearest the flywheel. In this position, the translational axis of the cylinder is rotated about fifteen degrees counterclockwise from its baseline position. This pivoting function provides the cylinder with a degree of freedom capable of promoting a smooth translational motion of the piston within the cylinder to reduce the likelihood that the piston will contact internal walls of the cylinder and seize the Stirling engine.

The flywheel 132 is represented in FIGS. 3 and 4 as coupled to a shaft 120 via a torque transfer belt 146, which is coupled to an impeller 118 of the compressor 116. As such, the mechanical energy produced by the Stirling engine 112 rotates the impeller 118 of the compressor 116, which is used by the compressor 116 to compress intake air (e.g., ambient air) and provide it to the combustion chambers of the IC engine. As with the embodiment of FIGS. 1 and 2, the shaft 120 can be functionally coupled to the impeller 118 through a gear box 122 and a shaft lubrication housing 124 (not shown in FIG. 4), for essentially the same reasons previously described in reference to FIGS. 1 and 2.

Regardless of the engine configuration used, the working fluid preferably comprises heat transfer and compression/expansion properties that promote the efficient operation of the Stirling engine 12 or 112, producing more mechanical energy with the available exhaust gas thermal energy. However, it is within the scope of the invention that any gaseous working fluid may be used.

The stirlochargers 10 and 100 disclosed herein may be further configured to generate electricity, for example, by including a power split device (50 in FIGS. 2 and 150 in FIG. 4) integrated with or coupled to the flywheel 32 or 132 of the stirlocharger 10/100. When the stirlocharger 10/100 is not providing power to systems at full capacity, it can be used to generate electrical energy and store it in a battery storage system. As such, the stirlocharger 10/100 may be capable of converting excess heat energy into electrical energy, even while the IC engine is in a low power state (for example, cruising at constant speed or idling) without or with little effect on transient performance when power demand is high (that is, accelerating).

Nonlimiting embodiments of the invention will now be described in reference to experimental investigations leading up to the invention. Stirlochargers having configurations corresponding to the beta- and alpha-type stirlochargers 10 and 100 were simulated using modeling software. The test results were then compared to baseline tests that were performed on a commercially available turbocharger. Tables 1 and 2 show the specifications of the simulated stirlochargers. The simulated stirlochargers were configured to operate on a four cylinder, 4-cycle diesel engine commercially available from Yanmar having model number 4TNV84T-ZDSAD.

TABLE 1

Specifications of the simulated stirlocharger comprising a beta-type Stirling engine.

| | |
|---|---|
| Bore (inch/cm) | 1.61/4.09 |
| Stroke (inch/cm) | 1.00/2.54 |
| Cylinder Material | Copper |
| Piston Material | Aluminum |
| Crank Radius (inch/cm) | 0.75/1.91 |
| Gear Ratio | 1:100 |

TABLE 2

Specifications of the simulated stirlocharger comprising an alpha-type Stirling engine.

| | |
|---|---|
| Bore (inch/cm) | 0.75/1.91 |
| Stroke (inch/cm) | 2.5/6.35 |
| Cylinder Material | Stainless Steel |
| Piston Material | Aluminum |
| Crank Radius (inch/cm) | 2/5.08 |
| Gear Ratio | 1:50 |

Figure 6:
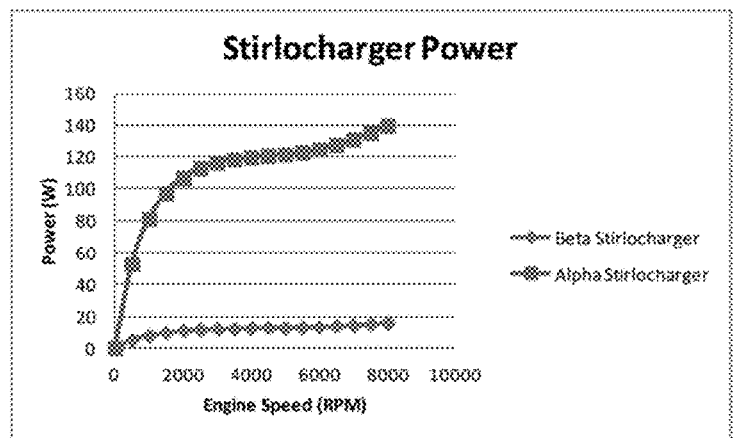
FIGS. 6 through 11 include graphs representing various simulated test results comparing devices that have compressors driven by beta and alpha-type Stirling engines.
Figure 7:
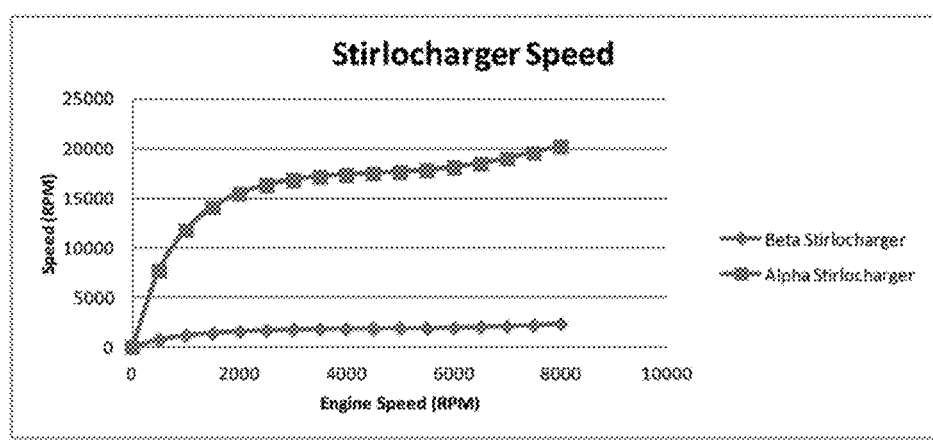
Figure 8:
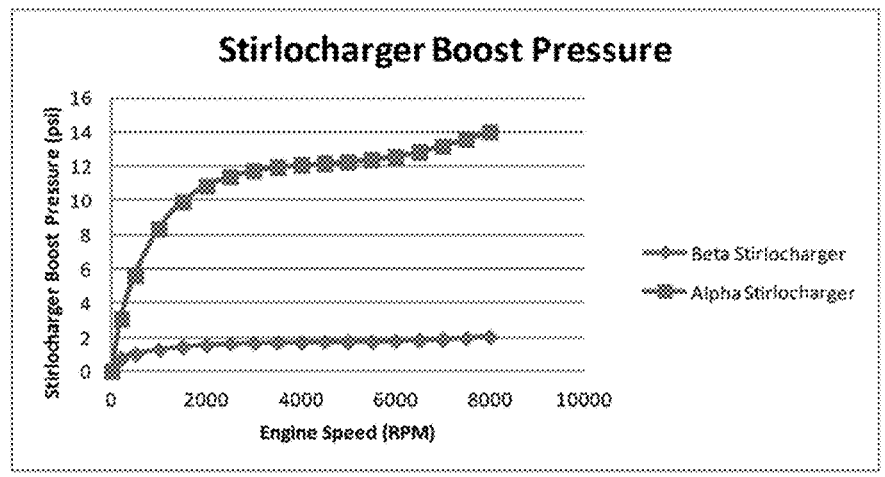
Figure 9:
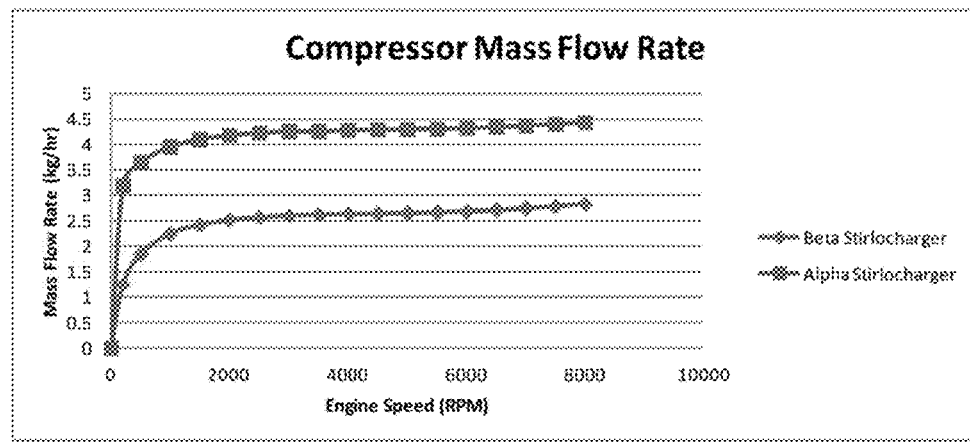

FIGS. 6 through 11 include graphs representing various simulated test results comparing the simulated stirlochargers. FIG. 6 represents output power of the stirlochargers. As represented, the simulated alpha-type Stirling engine generated significantly more power than the simulated beta-type engine. This increased power production by the alpha-type engine was due to its larger dimensions and therefore larger displaced volume. Also due to its larger piston and cylinder diameters, the alpha-type engine had a higher surface area for exhaust gas heat absorption through convection, providing for an increased work output. FIGS. 7, 8, and 9 represent operating speed, boost pressure, and mass flow rate of the simulated stirlochargers. Since all of these properties of a Stirling engine are dependant of the work output, the alpha-type engine was able to be operated at a significantly higher speed, boost pressure, and mass flow rate as expected in view of the results shown in FIG. 6.

Figure 10:
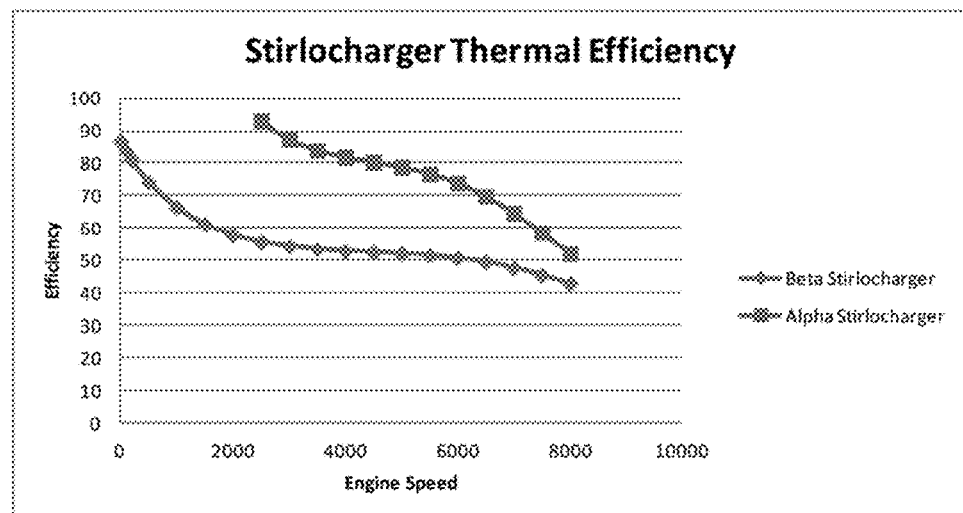

FIG. 10 represents the thermal efficiencies of the simulated stirlochargers. The thermal efficiencies of the stirlochargers were based on the convective heat transfer input to the hot side by the exhaust gases from the IC engine. As represented, the efficiencies dropped as the IC engine speed was increased due to higher exhaust gas velocities which provided less heat transfer time to the hot side of the Stirling engines resulting in a drop in thermal efficiency. It was determined that the efficiency of the alpha-type stirlocharger dropped at a steeper rate than the beta-type stirlocharger.

Figure 11:
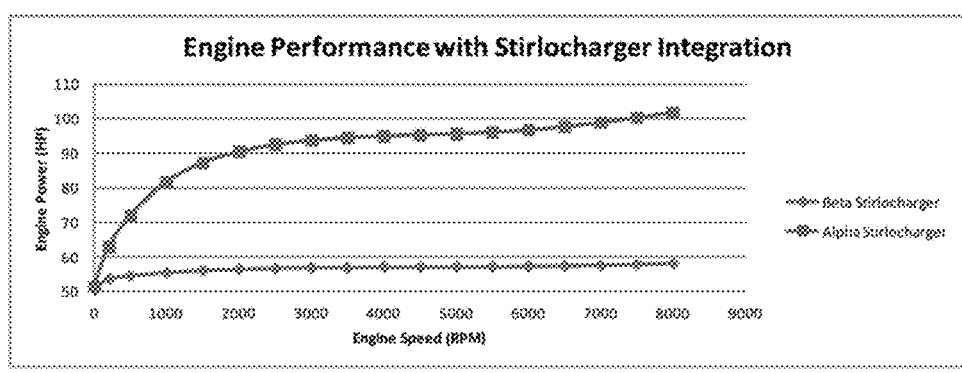

FIG. 11 represents IC engine performance with the stirlochargers. During the simulation, the base IC engine power output was 50 horsepower (hp) at 3000 rpm. The alpha-type stirlocharger had increased this power output to 95 hp at 3000 rpm, for ideal conditions.

In view of the forgoing, stirlochargers provide a promising alternative to existing superchargers and turbochargers. In addition to recovery of engine exhaust gas heat and electric generation, stirlochargers of the types described herein preferably eliminate or reduce power lag, back pressure, fuel consumption, noise, and emissions relative to commercially available turbochargers.

Turbochargers rely on exhaust gas pressure and therefore suffer from a power lag commonly noticed as a hesitation or slowed throttle response when accelerating. In contrast, stirlochargers of the types described herein generally start reciprocating as soon as the IC engine is turned on. The constant exhaust gas flow provides consistent thermal energy to the Stirling engine and keeps it operating. As soon as the driver provides a torque request and the engine speed increases, the temperature of the exhaust gases rises and provides more thermal energy to the stirlocharger. Although some lag may be present during a time period when the temperature of the exhaust gases is increasing, this lag is likely not noticeable to the driver as compared to a turbocharging system.

Since turbochargers operate by restricting the exhaust gases to rotate a turbine, back pressure may be caused within the IC engine. Since stirlochargers do not restrict the flow of the exhaust gases, they can operate without causing back pressure which improves the efficiency of the IC engine and may reduce residual burnt mass fraction within the combustion chamber relative to IC engines using a turbocharger. Although superchargers also do not restrict the flow of the exhaust gases, they utilize the crankshaft torque, and therefore add an extra parasitic loss to the engine and reduce the brake torque. Such issues are not encountered with stirlochargers.

Relative to turbochargers, stirlochargers may reduce emissions of an IC engine, particularly NOx emissions. For example, the amount of emissions an IC engine emits is highly dependent on in-cylinder conditions during the intake stroke, in particular, nitric oxide (NO) formation increases with higher temperatures. Otto cycle analysis shows that for every 10° K change in the intake charge temperature there is a 100° K change in the exhaust gas temperature, corresponding to a factor of 10. The elimination of the back pressure by using a stirlocharger instead of a turbocharger is able to reduce the intake charge temperature by approximately 20° K, causing an exhaust gas temperature reduction of 200° K which significantly reduces NOx emissions.

In most turbocharging systems noise is a concern, as they are generally loud at high rotational speeds. Stirlochargers, which comprise fewer parts and have relatively low friction between the parts, may operate significantly quieter that turbochargers.

Turbochargers require a wait time for lubricating oil to arrive from the IC engine. In contrast, Stirling engines have self-contained lubrication and do not require oil to be externally transported to the Stirling engine. Therefore, stirlochargers do not have a wait period for oil to arrive.

In view of the above, stirlochargers are capable of exhibiting improved thermodynamic efficiency, improved functionality at low pressure exhaust gasses, higher torque response, better control in transient phases, and reduced noise. These benefits can improve the mechanical and combustion efficiency of the IC engine and reduce fuel consumption and pollutant emissions.

While the invention has been described in terms of specific embodiments, it is apparent that other forms could be adopted by one skilled in the art. For example, the physical configuration of a stirlocharger could differ from those described or shown in the drawings, and various materials and processes/methods could be used to manufacture a stirlocharger. Therefore, the scope of the invention is to be limited only by the following claims.

The invention claimed is:

1. A system for use with an internal combustion engine comprising combustion chambers that draw in fuel and intake air and produce therefrom exhaust gases that exit the internal combustion engine through an exhaust gas flow passage, the system having an intake air charger comprising:
   a Stirling engine having at least a first cylinder having a piston therein coupled to a flywheel, a hot side associated with the first cylinder, and a cold side, the hot side of the first cylinder protruding into the exhaust gas flow passage so that an exterior surface of the first cylinder is within the exhaust gas flow passage, is in direct contact with the exhaust gases produced by the combustion chambers of the internal combustion engine, and absorbs heat from the exhaust gases through convection, the exhaust gases heating the hot side of the first cylinder during operation of the internal combustion engine and causing the Stirling engine to rotate a shaft; and
   a compressor driven by the shaft to compress air and provide compressed air to the combustion chambers of the internal combustion engine.

2. The system of claim 1, further comprising a gear box configured to amplify a rotational speed of an impeller in the compressor relative to a rotational speed of the shaft.

3. The system of claim 1, further comprising a shaft lubrication housing comprising an internal oil for lubricating moving components of the system.

4. The system of claim 1, wherein the Stirling engine has a beta-type configuration.

5. The system of claim 1, wherein the Stirling engine has an alpha-type configuration.

6. The system of claim 5, wherein the Stirling engine comprises at least a second cylinder having a piston therein coupled to the flywheel, the first and second cylinders being configured to pivot relative to each other to maintain a linear thrust force of the pistons thereof normal to a translational axis of their respective first and second cylinders as the flywheel rotates.

7. The system of claim 1, further comprising a power split device driven by the shaft to generate electricity during operation of the Stirling engine, and a battery storage system for storing the electrical energy.

8. The internal combustion engine of claim 1 with the system of claim 1 installed thereon.

9. A method of improving the efficiency of an internal combustion engine comprising combustion chambers that draw in fuel and intake air and produce therefrom exhaust gases that exit the internal combustion engine through an exhaust gas flow passage, the method comprising:
  providing a system comprising a Stirling engine, a compressor, and a shaft through which the compressor is connected to and driven by the Stirling engine, the Stirling engine having at least a first cylinder having a piston therein coupled to a flywheel, a hot side associated with the first cylinder, and a cold side, the hot side of the first cylinder protruding into the exhaust gas flow passage so that an exterior surface of the first cylinder is within the exhaust gas flow passage, in direct contact with the exhaust gases, and absorbs heat from the exhaust gases through convection;
  converting the heat recovered with the Stirling engine from the exhaust gases into mechanical energy that includes rotating the shaft;
  powering the compressor with the shaft to produce compressed air; and
  providing the compressed air to the combustion chambers of the internal combustion engine and produce therewith the exhaust gases.

10. The method of claim 9, further comprising providing a gear box to amplify a rotational speed of an impeller in the compressor relative to a rotational speed of the shaft.

11. The method of claim 9, further comprising providing a shaft lubrication housing on the system comprising an internal oil for lubricating moving components of the system.

12. The method of claim 9, wherein the Stirling engine has a beta-type configuration.

13. The method of claim 9, wherein the Stirling engine has an alpha-type configuration.

14. The method of claim 13, wherein the Stirling engine comprises at least a second cylinder having a piston therein coupled to the flywheel, the method further comprising pivoting the first and second cylinders relative to each other during operation of the Stirling engine to maintain a linear thrust force of the pistons thereof normal to a translational axis of their respective first and second cylinders as the flywheel rotates.

15. The method of claim 9, further comprising generating electricity with a power split device driven by the shaft during operation of the Stirling engine.

16. A vehicle comprising:
  an internal combustion engine comprising combustion chambers that draw in fuel and intake air and produce therefrom exhaust gases that exit the internal combustion engine through an exhaust manifold;
  a Stirling engine having at least a first cylinder having a piston therein coupled to a flywheel, a hot side associated with the first cylinder, and a cold side, the hot side of the first cylinder protruding into the exhaust manifold so that an exterior surface of the first cylinder is within the exhaust manifold, is in direct contact with the exhaust gases produced by the internal combustion engine, and absorbs heat from the exhaust gases through convection, the exhaust gases heating the hot side of the first cylinder during operation of the internal combustion engine and causing the Stirling engine to rotate a shaft; and
  a compressor driven by the shaft to compress air and provide compressed air to the combustion chambers of the internal combustion engine.

17. The vehicle of claim 16, further comprising means driven by the shaft for generating electrical energy and a battery storage system for storing the electrical energy.

* * * * *